Figure 2:
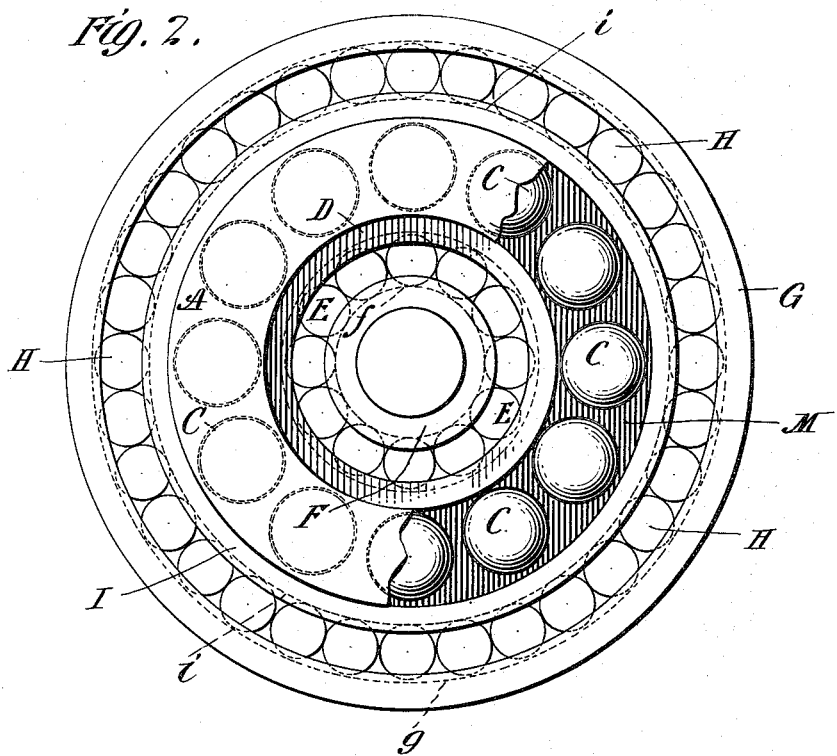

H. HESS.
ANTIFRICTION BEARING.
APPLICATION FILED FEB. 13, 1909.

1,008,643.

Patented Nov. 14, 1911.
2 SHEETS—SHEET 1.

Witnesses:

Inventor
HENRY HESS
By his Attorneys

H. HESS.
ANTIFRICTION BEARING.
APPLICATION FILED FEB. 13, 1909.

1,008,643.

Patented Nov. 14, 1911.

2 SHEETS—SHEET 2.

Witnesses:

Inventor:
HENRY HESS
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,008,643.  Specification of Letters Patent.  Patented Nov. 14, 1911.

Application filed February 13, 1909. Serial No. 477,743.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

My invention relates to anti-friction bearings, and more particularly to that class thereof designed to resist both radial and end thrust.

Generally speaking, it comprises three sets of connected bearings, two of them being arranged to take radial load, and the third to receive thrust loads and being located between the two radial bearings. An important feature and distinguishing characteristic of this arrangement is that the radial bearings are intended chiefly, if not exclusively, to sustain radial pressure, and the interposed thrust bearing is designed chiefly, if not exclusively, to sustain thrust pressure.

In order to produce a bearing of the character described, in its simplest, cheapest and most compact and efficient form, I connect them in such way that one of the casing members of each of the radial bearings forms a part of or is connected to one of the elements of the thrust bearing, and ordinarily so that the inner casing member of the outer radial bearing and the outer casing member of the inner radial bearing thus form a part of or are connected to the selected element of the thrust bearing. In the drawings hereto attached I have shown several preferred forms of this construction, but obviously many changes and variations may be made therein without departing from the spirit of the invention, and I desire it to be understood that it is not limited to any specific form or arrangement of parts, except in so far as such limitations are specified in the claims.

Figure 1:
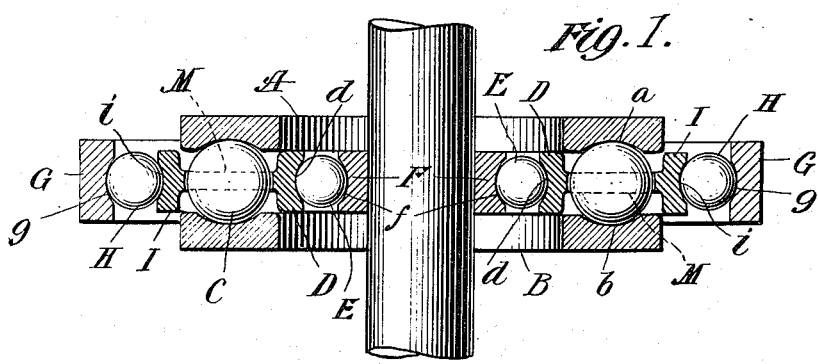
Figure 3:
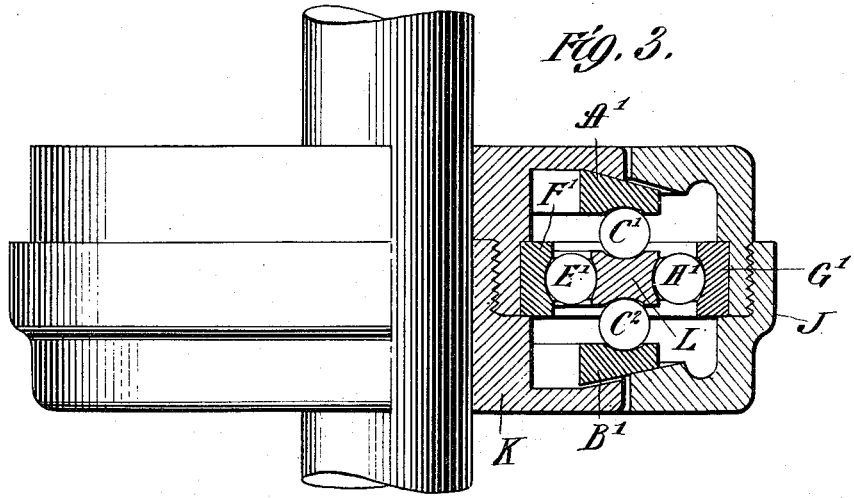

Referring to the drawings: Figure 1 is a transverse sectional view of an anti-friction bearing, having my invention applied thereto; Fig. 2 is a plan view of the same, with certain portions removed to show the relation of the operative parts; Fig. 3 is a transverse sectional view of a bearing illustrating another form of my invention; and Fig. 4 is a similar sectional view illustrating still another form.

Referring first to Figs. 1 and 2 of the drawings, the thrust bearing comprises the bearing plates or casing members A and B formed respectively with tracks or ways $a, b$, wherein are interposed the rolling elements or balls C, in the manner well understood in the art. The balls C are spaced and held in position by the cage M, the construction and arrangement of which are shown more clearly in Fig. 2, but which may be of any desired shape or construction. The casing members or bearing plates A, B, of the thrust bearing are connected to the operative parts, so as to sustain end thrusts. In the present instance, the two radial bearings, between which the thrust bearing is located, are connected to or integral with the cage M, this general arrangement being peculiarly adapted to provide a combined bearing, which is not only simple and cheap in point of manufacture, but also extremely compact and capable of the practical requirements for which it is intended. Around the thrust bearing previously described is located the outer annular bearing, which comprises the outer casing element or ring G and the inner casing element or ring I, formed respectively with the tracks or ways $g$ and $i$, wherein are located the rolling elements or balls H, in the manner well understood in the art. Inside of the thrust bearing is located the inner radial bearing, which comprises the outer casing member or ring D and the inner casing member or ring F, formed respectively with the tracks or ways $d$ and $f$, wherein are located the rolling elements or balls E. The inner casing member I of the outer radial bearing and the outer casing member D of the inner radial bearing, as previously stated, are connected to or integral with the cage M, which constitutes one of the elements of the thrust bearing. When the cage M is constructed of proper material, having the requisite strength and durability, the casing members or rings I and D may be formed integrally therewith, but if otherwise, they are formed independently and then connected to the cage in any desired or suitable manner. The two radial bearings referred to may be assembled in any well-known way, although I prefer to construct them with tracks or ways of the uninterrupted type, which are assembled by eccentric displacement according to the Conrad method. However, the method of assemblage is immaterial and constitutes no part of my invention. Thus, instead of employing the Conrad method, in the case of a full type bearing, such as is illustrated in Fig. 2, the rolling elements may be introduced in any desired manner, as for instance by the well-known filling opening, not shown. The thrust bearing is subsequently assembled by placing the balls C in their proper recesses in the cage M and locating the parts between the bearing plates or casing members A and B in the ordinary way. It will be noted that the construction of the combined bearings is such that in use the radial loads will be taken entirely by the outer and inner radial bearings, and that the thrust loads will be taken by the interposed thrust bearing, in the manner previously described.

In Fig. 3, I have shown a different form of bearing, but one also embodying my invention, wherein the thrust bearing comprises two sets of rolling elements or balls $C^1$ and $C^2$, with an interior or interposed bearing plate or casing member L and two exterior rings or casing members $A^1$ and $B^1$, the respective casing members L, $A^1$ and $B^1$ being formed with tracks or ways to receive and retain the balls $C^1$ and $C^2$, in the customary manner and as clearly shown in the drawing. Another distinction over the form previously described is that the tracks or ways for the balls of the two radial bearings are formed in part in a different element of the thrust bearing, to wit, the interior bearing plate or casing member L, instead of in the ball cage M, as shown in Figs. 1 and 2. The outer radial bearing thus comprises balls $H^1$, which track respectively in the outer casing member $G^1$ and the thrust bearing casing member L, and the inner radial bearing comprises balls $E^1$, which track respectively in the inner casing member $F^1$ and the casing member L of the thrust bearing. It will therefore be seen that in this particular form the interior bearing plate or casing member of the thrust bearing also constitutes the inner casing member of the outer radial bearing and the outer casing member of the inner radial bearing. This combined bearing may also be assembled in any desired manner, as for instance, by eccentric displacement according to the Conrad method. The bearing thus described is preferably mounted in a casing consisting of two parts J and K, arranged in close relation to the rings or casing members $F^1$ and $G^1$ of the radial bearings, in order to support radial load, and in close proximity to the casing members $A^1$ and $B^1$ of the thrust bearing, but with sufficient play to permit thrust to be sustained in either direction, all in the manner well understood in the art.

Figure 4:
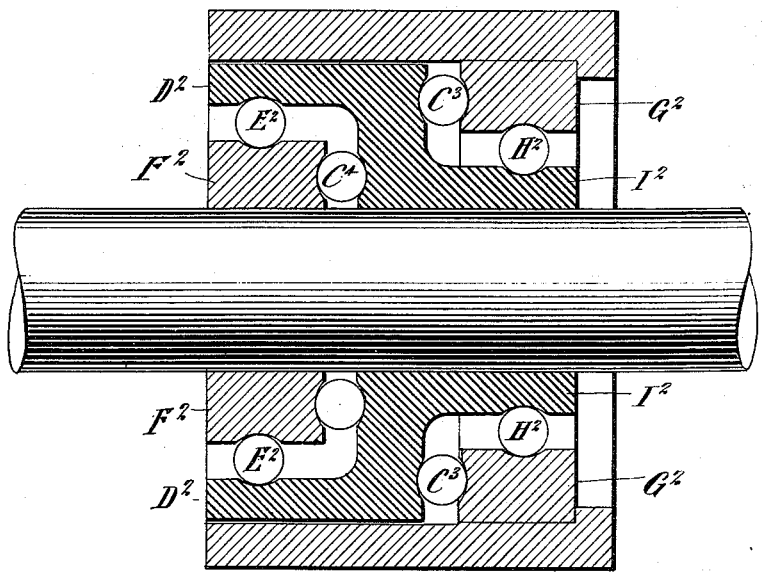

In Fig. 4, I have illustrated still another form of my invention as applied to a bearing of substantially the type shown in my application for Letters Patent, No. 393,322, filed September 17, 1907. One of the distinguishing characteristics of this form of bearing is that it comprises casing members having extended portions located in proximity to the contiguous parts, or with only sufficient clearance to permit the formation of oil films therebetween, which construction and arrangement possess the advantages set forth in the said application. In the form here illustrated the inner radial bearing comprises the inner casing member $F^2$ and the outer casing member $D^2$, with the balls $E^2$ interposed therebetween, and the outer radial bearing comprises the inner casing member $I^2$ and the outer casing member $G^2$, with the balls $H^2$ interposed therebetween. It will be noted that the casing members $D^2$ and $I^2$, respectively, are integral with each other and are located in close proximity to the contiguous parts, and with only sufficient clearance to permit the formation of oil films therebetween. In this form the thrust bearing comprises two sets of balls $C^3$ and $C^4$, which are interposed respectively between the casing members $G^2$ and $D^2$, and the casing members $I^2$ and $F^2$. As in the form illustrated in Fig. 3, and due to the integral connection of the casing members $I^2$ and $D^2$, it will be seen that both sets of radial balls as well as both sets of thrust balls track partly in the single or integral bearing plate or casing member $I^2$, $D^2$, the chief distinction being that the two radial bearings are here arranged in parallel planes, instead of in the same plane.

I have thus shown my invention as applied in several different forms, in all of which one of the casing members of each of the radial bearings forms a part of one of the elements of the thrust bearing. Evidently many variations will suggest themselves to those skilled in the art, and I do not limit myself to the exact embodiments of the invention shown, which I have illustrated only in preferred forms, as many equivalents are equally comprised within its scope.

Having thus described my invention, its construction and mode of operation, what I claim and desire to secure by Letters Patent of the United States is as follows:

1. An anti-friction bearing comprising two radial bearings and a thrust bearing located between them, one of the casing members of each of the radial bearings forming a part of one of the elements of the thrust bearing, and the other casing members of the radial bearings being disconnected and relatively movable.

2. An anti-friction bearing comprising two radial bearings and a thrust bearing located between them, the inner casing member of the outer radial bearing and the outer casing member of the inner radial bearing forming a part of one of the elements of the thrust bearing, and the other casing members of the radial bearings being disconnected and relatively movable.

3. An anti-friction bearing comprising two radial bearings and a thrust bearing located between them, one of the casing members of each of the radial bearings forming a part of one of the casing members of the thrust bearing, and the other casing members of the radial bearings being disconnected and relatively movable.

4. An anti-friction bearing comprising two radial bearings and a thrust bearing located between them, the inner casing member of the outer radial bearing and the outer casing member of the inner radial bearing forming a part of one of the casing members of the thrust bearing, and the other casing members of the radial bearings being disconnected and relatively movable.

5. An anti-friction bearing comprising two radial bearings and a thrust bearing located between them, one of the elements of the thrust bearing being formed with tracks or ways for the respective rolling elements of each of the radial bearings, and the other casing members of the radial bearings being disconnected and relatively movable.

6. An anti-friction bearing comprising two radial bearings and a thrust bearing located between them, one of the elements of the thrust bearing being formed with tracks or ways to constitute respectively the inner casing member of the outer radial bearing and the outer casing member of the inner radial bearing, and the other casing members of the radial bearings being disconnected and relatively movable.

7. An anti-friction bearing comprising two radial bearings and a thrust bearing located between them, one of the casing members of the thrust bearing being formed with tracks or ways for the respective rolling elements of each of the radial bearings, and the other casing members of the radial bearings being disconnected and relatively movable.

8. An anti-friction bearing comprising two radial bearings and a thrust bearing located between them, one of the casing members of the thrust bearing being formed with tracks or ways to constitute respectively the inner casing member of the outer radial bearing and the outer casing member of the inner radial bearing, and the other casing members of the radial bearings being disconnected and relatively movable.

9. An anti-friction bearing comprising two radial bearings and a thrust bearing located between them, the thrust bearing having two sets of rolling elements and an interposed bearing plate therefor, which plate is also formed with tracks or ways for the respective rolling elements of each of the radial bearings, and the other casing members of the radial bearings being disconnected and relatively movable.

10. An anti-friction bearing comprising two radial bearings and a thrust bearing located between them, the thrust bearing having two sets of rolling elements and an interposed bearing plate formed on two sides with tracks or ways therefor, and on the other two sides with tracks or ways for the respective rolling elements of each of the radial bearings, and the other casing members of the radial bearings being disconnected and relatively movable.

11. In a device of the class described, in combination with two members having co-axial raceways and a plurality of balls positioned within said raceways; of a separator provided with a plurality of pockets each having an outer wall co-axial with said raceways, and adapted to retain said balls in a prescribed path therein; a fixed ring surrounding said separator and in the same plane; and a plurality of balls interposed between said separator and said fixed ring adapted to retain said separator balls in a path co-axial to said raceways.

In testimony whereof I have affixed my signature in presence of two witnesses.

HENRY HESS.

Witnesses:
MARY M. CALLA,
NETTIE L. HAHN.